United States Patent [19]

Savage

[11] 3,960,584

[45] June 1, 1976

[54] WATER-DISPERSIBLE, HIGH MOLECULAR WEIGHT POLYMER COMPOSITIONS

[75] Inventor: Albert B. Savage, Midland, Mich.

[73] Assignee: The Dow Chemical Company, Midland, Mich.

[22] Filed: Feb. 2, 1973

[21] Appl. No.: 328,952

[52] U.S. Cl............................. 106/178; 106/197 R; 260/29.6 H; 260/29.6 E; 260/29.6 ME
[51] Int. Cl.².......................................... C08L 1/26
[58] Field of Search...... 260/29.6 H, 803 N, 29.6 N, 260/29.6 E, 33.4 R, 33.2 R, 29.6 BE, 29.6 ME; 252/316; 106/197, 178; 117/100 C

[56] References Cited
UNITED STATES PATENTS

| | | | |
|---|---|---|---|
| 2,737,458 | 3/1956 | Burnham | 260/29.6 BE |
| 2,914,412 | 11/1959 | Stephan | 106/211 |
| 2,993,022 | 7/1961 | Coler | 260/29.6 BE |
| 3,122,203 | 2/1964 | Hawkins | 166/38 |
| 3,150,110 | 9/1964 | Becker | 260/29.6 ME |
| 3,362,847 | 1/1968 | Day | 106/186 |
| 3,402,137 | 9/1968 | Fisher | 260/80.3 N |
| 3,449,142 | 6/1969 | Hearst | 106/211 |
| 3,503,895 | 3/1970 | Whelan | 106/181 |
| 3,634,305 | 1/1972 | Johnson | 260/33.4 R |
| 3,657,182 | 4/1972 | Jolly | 117/100 C |
| 3,734,873 | 5/1973 | Anderson | 260/29.6 H |
| 3,839,500 | 10/1974 | Dexter | 260/874 |

FOREIGN PATENTS OR APPLICATIONS 841,127 7/1960 United Kingdom........... 260/29.6 H

OTHER PUBLICATIONS

Practical Emulsions, Bennett et al., 1968, pp. 128 & 129.

*Primary Examiner*—Theodore Morris
*Attorney, Agent, or Firm*—Richard W. Hummer

[57] ABSTRACT

The invention consists of a composition of matter consisting of finely divided, high molecular weight, water-soluble polymeric material in intimate mixture with from one to four other components and a process for the preparation thereof. The invention composition is highly dispersible and rapidly soluble in aqueous media without skinning and agglomeration and is useful as a flocculant and thickener in many industrial processes.

21 Claims, No Drawings

WATER-DISPERSIBLE, HIGH MOLECULAR WEIGHT POLYMER COMPOSITIONS

BACKGROUND OF THE INVENTION

1. Field of the Invention

Water-soluble polymers and copolymers, hereinafter polymeric materials, of high molecular weight have been employed to flocculate suspended solids in mining operations and in sewage and water treatment. They have also been found useful as thickeners in the paper industry and the building trade. Difficulties are encountered, however, when the polymer or copolymer is introduced to an aqueous medium. In the finely divided form, the polymeric materials tend to "skin" on the surface of the aqueous medium, more of the polymeric material being piled on the surface of the "skin" until the "skin" will no longer support the added weight, whereupon the entire mass sinks below the surface of the medium enveloped by a partially hydrated film to form an agglomeration often referred to as a "slub" or a "fish-eye". Such hydrated globules thereafter are dissolved with great difficulty, generally only after mechanical agitation over an extended period of time.

Larger particles of the polymeric material may be utilized and the "skinning" and subsequent "slub" formation is thereby avoided. While the use of larger particles avoids the "skinning" effect, it generally increases the time required for complete solution of the polymeric material as compared to the equally well-dispersed material of smaller particle size.

Good dispersion (i.e., lack of "skinning," "slubs" and "fish-eyes") has previously been attained by agitation of the aqueous medium with simultaneous addition of the polymeric material. Using this method, it is usually impossible to entirely avoid "slubs" and "fish-eyes" and though these may be mechanically filtered out or finally dissolved by extended agitation, the consequent waste of polymeric material and increase in process time is both costly and inconvenient. Additionally, extended shearing agitation fragments most polymeric materials with a loss in solution viscosity, one of the desired properties of these polymeric materials, and is to be avoided if possible.

Special equipment which utilizes the venturi effect to disperse polymeric materials in aqueous media has been devised, but care and time are needed if all "slubs" and "fish-eyes" are to be avoided.

A composition of polymeric material which is readily dispersible and rapidly soluble upon introduction into an aqueous medium is highly desirable in flocculation, coagulation, thickening and other aqueous-based processes in which such polymeric materials are employed.

DESCRIPTION OF THE PRIOR ART

P. W. Fischer et al. in U.S. Pat. No. 3,402,137 (1968) teach the addition of "water-soluble solid acids and acid salts" and optionally solid polyethylene glycols, ethylene oxide-propylene oxide adducts and polyvinyl alcohols to water-soluble acrylamide polymer to enhance the dispersibility and dissolution of the solid polymer in an aqueous medium. M. F. Katzer in U.S. Pat. No. 3,305,019 (1967) teaches the use of an acrylamide polymer which has been dispersed in a solid, water-soluble binder, chiefly polyoxyalkylene polyols, with the optional addition of "anionic or nonionic detergents" and optional weighting agents to increase composition density, to reduce sand-blocking of gas wells utilizing the enhanced dispersibility of the thus-treated polymer.

In my U.S. Pat. No. 3,350,338 (1967), acrylic amide polymers are surface treated with lower monoalkyl ethers of diethylene glycol, diethylene glycol monomethyl ether acetate or 2-ethylhexanediol-1,3 with optional addition of a nonionic fatty acid monoester of a water-soluble polyol surfactant. Enhanced dispersibility and solubility were observed in the treated polymers. Acrylic polymers treated with surface-active agents in a mixture with sodium sulfate are taught to have increased dispersibility in aqueous media by C. S. Jolly in U.S. Pat. No. 3,657,182 (1972). Several other ingredients are optionally added to this mixture. A. C. Johnson et al., U.S. Pat. No. 3,634,305 (1972), teach the use of a "nonionic, water-soluble liquid surfactant" in which high molecular weight water-soluble polymers may be dispersed, with the beneficial result that the polymer so dispersed is more resistant to the shear degradation of pumping and more readily dispersible in aqueous media.

Cold water-soluble cellulose ethers have been treated with hot aqueous solutions of surface-active agents, derivatives of lauryl alcohol, in the teaching of A. W. Anderson et al. in U.S. Pat. No. 2,647,064 (1953) to enhance cold water dissolution. Treatment of water-soluble polymers with an acid catalyst, lower aliphatic aldehyde and a monionic polyoxyethylene ester surfactant is taught in U.S. Pat. No. 3,489,719 (1970) with good water dispersibility and subsequent dissolution of the polymer in an alkaline aqueous medium.

SUMMARY OF THE INVENTION

The invention is directed to a composition of matter comprising an intimate mixture of a finely divided, high molecular weight, water-soluble polymeric material with at least one and up to four other components and to a process for the preparation of said composition. As polymeric particle size, polymeric composition and degree of hydrolysis vary, certain of the four components may be omitted or, optionally, retained. The composition is highly dispersible and rapidly soluble in aqueous media without skinning or the formation of hydrated agglomerates which accompany the attempted dispersion and dissolution of the polymeric material alone. The composition is useful as a flocculant and thickener in numerous industrial processes and, since dusting is greatly reduced, is more readily handled in a finely divided state than the polymeric material of comparable particle size.

DETAILED DESCRIPTION OF THE INVENTION

When finely divided, high molecular weight, water-soluble polymeric materials are utilized as aqueous solutions or gels, a major problem is encountered when the polymeric material, ordinarily available as a finely divided dry particulate or powder, is introduced to the aqueous medium in which it is to perform its designated function. "Skinning" of the dry material occurs on the surface of the aqueous medium upon the addition of small amounts of the material. Further addition of polymeric material results in that material being supported on the "skin" until the mass becomes of such weight that it sinks below the surface of the aqueous medium with the "skin" folding around the mass to form a hydrated envelope. Such a mass is referred to commonly as a "slub," "fish-eye" or "agglomerate." These "slubs" thereafter resist further solvation forming lumps in the aqueous medium where a smooth, homogeneous solution is desired.

"Slubs" must be mechanically filtered since they will tend to clog small diameter conduits where such conduits are employed in the process used, this results in a waste of time and materials. If the process is such that the presence of "slubs" will not impair implementation of the process used, their formation means that to attain a desired concentration of the polymeric material in solution, more than the desired quantity of polymeric material must be added.

Alternatively, agitation of the aqueous medium containing the "slubs," may be employed to eventually attain a fairly homogeneous solution but normally such treatment requires extended time to achieve the desired homogeneity. Moreover, extended shearing agitation tends to degrade the dissolved polymeric material resulting in lower viscosity than might otherwise be attained. Such degradation is naturally to be avoided if possible.

Apparatus has been devised to add dry polymeric materials to the vortex of a stream of water or aqueous solution in a venturi tube thereby avoiding to a great extent "skinning" and the formation of "slubs." The method will not entirely avoid the formation of some "slubs" and subsequent agitation is often required to attain a homogeneous solution. The correct operation of such an apparatus also requires careful adjustment and gradual addition of polymeric material, adding more time to any process employing this method.

For optimum utility, a polymeric material should enter aqueous media without "skinning," i.e., have good dispersibility, and dissolve rapidly once in the aqueous media, i.e., have rapid solubility. The composition of the present invention has the attributes of good dispersibility and rapid solubility in aqueous media and is conveniently handled since the invention composition has less dust when compared with the polymeric material alone of about the same particle size.

Polymeric materials which are employed in the invention include generally any high molecular weight, water-soluble homopolymers and copolymers, copolymers being those with two or more distinct kinds of comonomeric units. High molecular weight, as used herein, is defined as an average molecular weight of from about 50,000 up to about 10,000,000 or more. Water-soluble, as used herein, is defined as solubility in aqueous media to the extent of at least about 1% by weight of the polymeric material in water at about room temperature where 99+% of the polymeric material dissolves, as determined by visual observation.

Representative polymeric materials utilized in the preparation of the invention composition include the homopolymer of acrylamide or methacrylamide and copolymers of acrylamide or methacrylamide with each other or with one or more of the following: acrylic acid, sodium acrylate, potassium acrylate, sodium ethylene sulfonate, potassium ethylene sulfonate, vinyl acetate, vinyl alcohol, methacrylic acid, methyl methacrylate, sodium methacrylate, potassium methacrylate, a 2 to 5 carbon hydroxyalkyl acrylate or methacrylate, aminoethyl acrylate or methacrylate, acrylonitrile, vinylbenzyltrimethyl ammonium chloride, maleic acid and its ammonium and alkali metal salts, vinylpyrrolidone, vinylmethyl ether and the like. Cellulose ethers such as methylcellulose, ethyl methylcellulose, sodium carboxymethylcellulose, hydroxypropyl methylcellulose, hydroxyethylcellulose, carboxymethyl hydroxyethylcellulose, ethyl hydroxyethylcellulose and natural gums, soluble starches and other natural water-soluble polymers are also polymeric materials which are of use in the preparation of the invention composition.

In some instances, as with polyacrylamide, the polymeric material may be partially hydrolyzed with the result that to a certain degree the monomeric units are replaced by hydrolyzed monomeric units, for example, some acrylamide units will be changed to acrylic acid units. The degree of hydrolysis is expressed as the percent of monomeric units which have been hydrolyzed, for example, a copolymer of acrylamide and acrylic acid, 50 units of each monomer, can be referred to as 50% hydrolyzed polyacrylamide.

Since the above-mentioned polymeric materials are useful in numerous industrial processes in aqueous media, compositions comprising such polymeric materials and other components and which have increased dispersibility and rapid solubility will have enhanced value to various industries. Among the many uses which the above-mentioned polymeric materials and consequently the invention composition have are: flocculants in mining, pollution abatement and related water treatment operations, thickeners for coating suspensions and furnish coagulents in paper making, thickeners for mortars, plasters, cements and groutings to achieve desired workability in the building trade and uses as flocculants and thickeners whenever rapid aqueous solution of high molecular weight, water-soluble polymeric materials are desired without accompanying "skinning," "slubs" and "fish-eyes."

In practicing the invention process to obtain the invention composition, components A, B, C and D are brought into intimate mixture with a chosen polymeric material in a suitable fashion.

One method for achieving the desired mixture is to place the dry, finely divided polymeric material in a conventional blender, conveniently a sigma-bladed or a ribbon mixer and applying, as a spray, an aqueous solution of components A, B, C and D in the desired proportions. Dry components may be first mixed as powders with the polymeric material, if desired. Optimum results are obtained with efficient mixing and blending over a relatively long application time of from one-half to two hours, depending on the size of the batch. The batch may thereafter be subjected to moderate temperatures to evaporate the excess water if necessary and to achieve desired consistency. The dry composition may then be added to an aqueous medium in the desired amount with rapid dispersion and dissolution.

The composition of polymeric material and components A, B, C and D may also be achieved by blending said components into a polymerized mass which has achieved viscosity, i.e., after polymerization has been completed or into a gel prepared from the dry polymeric material. This is conveniently done by introducing a mixture of components A, B, C and D in desired proportions into the conduit through which the viscous polymerized mass leaves the polymerizer or gelling vessel, spreading the mixed components evenly over the surface of the viscous mass as it leaves the polymerizer or vessel. This mass is then passed through a blender, suitably an interfacial surface generator, in such a manner that polymeric material and components A, B, C and D are uniformly and intimately mixed. The viscous mass may then be dried in the manner conventional to the polymeric material therein and finely divided to the desired particle size in a ball or roll mill or by other suitable means. The finished composition may then be used as described above.

For a chosen polymeric material, where components A, B, C and D are such that they do not act as chain-transfer or chain-termination agents for the polymerization of the monomer or comonomers of the chosen polymeric material, components A, B, C and D in desired proportions may be added, by intimately mixing them with the unpolymerized monomers or comonomers of the polymeric material and then initiating polymerization. Processing of the polymerized materials is carried out in the same manner as if components A, B, C and D were not present. If the polymerized product is a precipitate in bead form, no further treatment except drying may be necessary unless smaller particle size is desired. Particles of the desired size may suitably be obtained by conventional mechanical methods as described above. If the polymerized product is a viscous mass, the product may be dried and milled as above described, in the conventional manner, to obtain the composition of desired particle size.

Where a polymeric material of particle size greater than about 1.7 millimeter (about 12 US mesh) is employed, components B, C and D or any one or two of them may be omitted since larger particles generally are not subject to "skinning;" however, a low density polymeric material of large particle size may encounter "skinning" problems and the four components may be beneficially employed when such a material is chosen for incorporation in the invention. Extremely minute particles of polymeric material are difficult to disperse in nearly all cases. The smaller the desired particle size, the higher will be the percentage of components A, B, C and D that is employed. Particle size of about 0.06 millimeter (about 230 US mesh) to about 1.7 millimeter (about 12 US mesh) for the invention composition is suitable, with a range of about 0.1 to about 1.7 millimeter (about 140 through about 12 US mesh) being preferred.

As previously noted, acrylamide and methacrylamide polymers and copolymers are often hydrolyzed to some degree; for example, some acrylamide units are hydrolyzed to acrylic acid units or vinyl acetate units are hydrolyzed to vinyl alcohol units. When the degree of hydrolysis of a polyacrylamide polymeric material is less than about 10%, a composition of good dispersibility and rapid solubility is attained in an intimate mixture of polymeric material with components A and B only. Either component C or D or both may also be added with no deleterious effect on desired properties. Components C and D or either of them may be also be omitted in a composition composed of polyacrylamide or polymethacrylamide polymeric material and components A and B, where the polymeric material is a copolymer in which the acrylamide or methacrylamide monomer unit has been replaced to a degree of less than about 10% by comonomer units which have a rate of hydration that is greater than that of polyacrylamide, for example, a 5% vinyl alcohol-95% acrylamide copolymer. In the case of cellulose ether polymeric materials, it is found that some materials form gels in aqueous media at lower temperatures than other materials. As a general proposition, those cellulose ether materials gelling at lower temperatures may be suitably coated with components A and B, and optionally C and D, to give compositions with good dispersibility and solubility. The higher-gelling materials are more suitably coated with components A, B, C and D to give compositions with good dispersibility and solubility.

The invention composition attains the desired dispersibility and rapid solubility when components A, B, C and D are intimately mixed with the polymeric material in from a small but effective amount, the combined weight of components A, B, C and D being on the order of about 0.1% of the weight of the polymeric material, up to the point where A, B, C and D's combined weight is about 10% of the weight of the polymeric material. The preferred composition of the invention is that in which components A, B, C and D's combined weight is from about 3% to about 8% of the weight of the polymeric material.

Components A, B, C and D may be added in varying amounts within the total weight percentage range described above. Based on the weight of the polymeric material, suitably, the weight of component A may be from about 2% to about 8%, the weight of component B may be from about 0.1% to about 2%, the weight of component C may be from about 0.1% to about 2% and the weight of component D may be from about 0.1% to about 2%. Preferably, the weights of components A, B, C and D, are about 3%, 0.25%, 0.5% and 0.5%, respectively, based on the weight of the polymeric material.

Component A is a water-soluble polyol selected from the group of lower aliphatic polyols of less than about 200 average molecular weight and lower polyalkylene glycols of from about 400 to about 9,000 average molecular weight. Suitable substances are glycerol, pentaerythritol, trimethylolethane, trimethylolpropane, sorbitol and polypropylene and polyethylene glycols and mixed or block polyethylene-polypropylene glycols with the oxyethylene:oxypropylene ratio greater than about 0.33:1 or less, to retain water solubility. Preferred for utilization in the invention composition are polyethylene glycols of about 600 to about 2000 average molecular weight; The Dow Chemical Company's product, Polyglycol E1000, works well in this capacity.

Component B is a surface-active agent having a Hydrophile-Lipophile Balance (hereinafer HLB) of from about 15 to about 40, as HLB has been defined by Davies and Rideal in Chapter 8 of *Interfacial Phenomena*, pp. 372–377 (2nd Ed. 1963). Component B is selected from the group consisting of:

a. potassium and sodium salts of fatty acids;

b. potassium and sodium salts of aryl- and alkaryl-carboxylic acids;

c. potassium and sodium sulfonates of fatty acids and of fatty acid higher esters;

d. potassium and sodium salts or aryl- and alkaryl-sulfonates and -disulfonates;

e. potassium and sodium salts of higher alkanol and hydroxyalkaryl sulfates; and f. potassium and sodium salts of carboxylic acid substituted quaternary amines.

Suitable substances are potassium oleate, monopotassium phthalate, sodium dodecylbenzenesulfonate, disodium didodecyldiphenyl oxide disulfonate, disodium dodecyldiphenyl oxide disulfonate, disodium didecyldiphenyl oxide disulfonate, disodium decyldiphenyl oxide disulfonate, disodium didodecyldiphenyl oxide disulfonate monochlorinated, sodium salt of di(2-ethylhexyl)sulfosuccinate, sodium p-toluene sulfonate, sodium lauryl sulfate, sodium styrene sulfonate and the Miranol Chemical Company's brand name MIRANOL J2M surfactant. A preferred embodiment of the invention uses a mono- and di-dodecyldiphenyl oxide disodium disulfonate mixture, produced by The Dow Chemical Company under the trademark of DOWFAX 2A1 surfactant.

Component C is a surface-active agent of from about 15 to about 18 HLB selected from the group consisting of lower oxyalkylene ethers and polyethers of aliphatic polyols and polyol anhydrides, having an average molecular weight of from about 200 to about 6,000, wherein about 30% to about 90% of the weight of component C consists of lower oxyalkylene units. By lower oxyalkylene unit is meant an oxyethylene or an oxypropylene unit which may be linked to other oxyethylene or oxypropylene units or a mixture thereof to form linear chains. A preferred embodiment of the invention utilizes a propylene oxide adduct of glycerol of about 700 average molecular weight produced by The Dow Chemical Company under the trademark of VORANOL CP700 polyether polyol. Also suitable for use in the invention are the monolaurate, monopalmitate, monostearate and monooleate of sorbitan which have been etherified with from a 4 to 20 unit polyoxyethylene chain at one of the sorbitan hydroxy functions.

Component D is a nonionic surface-active agent of less than about 10 HLB. Practically any surface-active agent with less than about 10 HLB is functional with liquids sorbitan monolaurate and monooleate being suitable, and solid materials such as sorbitan monostearate and sorbitan monopalmitate being among the preferred nonionic surface-active agents. Component D is chosen so as to be at least emulsifiable with the other components in an aqueous medium.

Although any of the above-mentioned components within the defined groups may be employed in the preparation of the invention composition, components A, B, C and D are preferably solids at about room temperature since the dry-flow properties of the invention are improved with the employment of components A, B, C and D which are solids.

It may occasionally be desirable to use more than one species within a component group, for example, using a lower oxyalkylene polyether of both an aliphatic polyol and an aliphatic polyol anhydride, i.e., VORANOL CP700 polyether polyol and Atlas Chemical Company's product of the trademark TWEEN 20 polyoxyethylene ether of sorbitan monolaurate. When such a combination is employed, the total weight of that component is within the percentage ranges described above.

DESCRIPTION OF SPECIFIC EMBODIMENTS OF THE INVENTION

The followng examples are directed to specific embodiments of the invention. After preparation of the composition of the invention, in some instances the composition was added to about 400 milliliters of ion exchange (deionized) water at about room temperature. Enough of the invention composition was added to make about a 0.5% concentration solution. Once the composition was added to the water in a 600 milliliter beaker, the solution was stirred with a small motor-driven blade or paddle agitator at about 100 r.p.m. with viscosity readings being taken on a separate L.V.F. Brookfield viscometer apparatus at one minute intervals. Readings were usually made at 60 r.p.m., with number 4 and number 2 spindles being used for higher and lower viscosity compositions, respectively.

The viscosity of the samples tested, as a function of time, gives a rough idea of the rate of solubility of the samples. For dispersibility, addition of a sample to quiescent water which is then stirred gives an idea of the sample's dispersibility since "skinning" and formation of lumps and balls will be apparent with samples of poor dispersibility. Percentages in the following examples are based on weight except percent hydrolysis which is defined above. Some of the materials that are used in the examples are The Dow Chemical Company's products under the trademarks of:

SEPARAN PG5 polymer, a polyacrylamide of about 5% hydrolysis and about two million average molecular weight;

SEPARAN AP273 polymer, a polyacrylamide of about 30% hydrolysis and about six million average molecular weight;

SEPARAN AP30 polymer, a polyacrylamide of about 30% hydrolysis and about three million average molecular weight;

SEPARAN AP45 polymer, a polyacrylamide of about 15% hydrolysis and about three million average molecular weight;

SEPARAN MG200 polymer, a polyacrylamide of about 3% hydrolysis and about six million average molecular weight;

METHOCEL MC400 methylcellulose, a methylcellulose ether of about 1.7 to 1.9 degree of substitution and about forty thousand number average molecular weight and about 400 centipoise viscosity;

METHOCEL 65HG4000 hydroxypropyl methylcellulose, a cellulose ether of about 0.2 degree of hydroxypropyl substitution and about 1.7 to 1.9 degree of methyl substitution, about eighty-five thousand number average molecular weight and about 4000 centipoise viscosity;

VORANOL CP700 polyether polyol, a propylene oxide adduct of glycerol of about 700 average molecular weight;

DOWFAX 2A1 surfactant, a mixture of disodiumdisulfonate didodecyldiphenyl oxide and disodiumdisulfonate dodecyldiphenyl oxide. Other materials used are:

SPAN 60 surfactant, a trademark of Atlas Chemical Industries, Inc., a sorbitan monostearate;

TWEEN 61 surfactant, a trademark of Atlas Chemical Industries, Inc., a sorbitan monostearate which has been etherified with 4 ethylene oxide units;

DUPONOL ME surfactant, a trademark of E. I. duPont de Nemours and Company, a technical grade sodium lauryl sulfate;

MIRANOL J2M surfactant, a trademark of the Miranol Chemical Company, a N,N,N-(disodium carboxylate hydroxy)-dihydrononylimidazole compound.

EXAMPLE 1

About 200 grams of SEPARAN AP273 polymer were placed in a sigma-bladed mixer and mixed with about 1% of its weight of potassium oleate. A mixture of 99.5% pure glycerol, The Dow Chemical Company's polypropylene glycol P400 of about 400 average molecular weight and VORANOL CP700 polyether polyol, each in an amount of about 2.5% of the weight of the polymeric material, was prepared and sprayed over the polyacrylamide-potassium oleate mixture with continuous mixing in the sigma-bladed mixer. Mixing was continued for one hour after spraying was completed. The composition was then passed through a 12 US mesh screen. This composition dispersed readily when poured into water of room temperature, without lumping and with very little agitation.

EXAMPLE 2

About 800 grams of a 20% gel of SEPARAN AP30 polymer, containing about 0.4% MIRANOL J2M surfactant, was mixed in a sigma-bladed mixer, in the designated amounts, with:

| Components Added | As a Percentage of the Weight of Polymeric Material |
| --- | --- |
| 99.5% glycerol | 2.5 |
| polypropylene glycol P400 (average molecular weight 400) | 2.5 |
| VORANOL CP700 polyether polyol | 2.5 |
| monopotassium phthalate | 1.0 |

The gel was dried on steam-heated rolls at 160°C., flaked off and ground through a 12 US mesh screen in a knife mill. The composition was readily dispersible in water of room temperature without lumping and with very little agitation.

EXAMPLE 3

To about 350 milliliters of boiled water in a stirred resin reactor, about 100 grams of acrylamide monomer were added. A solution of about 0.05 gram of sodium sulfite and about 0.0005 gram of ferrous sulfate heptahydrate was added and the reactor was purged with nitrogen. A solution of about 0.05 gram of sodium persulfate was then injected and polymerization was allowed to proceed for about 3 minutes when about 34 grams of 50% sodium hydroxide and a mixture of:

| Components Added | As a Percentage of the Weight of Polymeric Material |
| --- | --- |
| 99.5% glycerol | 2.5 |
| polypropylene glycol P1200 (average molecular weight 1200) | 2.5 |
| VORANOL CP700 polyether polyol | 2.5 |
| DOWFAX 2Al surfactant | 1 | was added to the reactor vessel. The reaction was allowed to continue for about 80 minutes more and the product was thereafter roll dried on steam-heated rolls, flaked off and ground through a 12 US mesh screen in a knife mill. The composition, estimated to be about 30% hydrolyzed, was readily dispersible in water of room temperature without lumping and with little agitation.

EXAMPLE 4

About 200 grams of SEPARAN AP273 polymer were intimately mixed with a mixture of:

| Components Added | As a Percentage of the Weight of Polymeric Material |
| --- | --- |
| 96% glycerol | 2.5 |
| polypropylene glycol P400 | 2.5 |
| VORANOL CP700 polyoxypropyl glycerol | 2.5 |
| DOWFAX 2Al surfactant | 1 | in the manner described in Example 1 above. The product had excellent water dispersibility. A 0.5% solution of the composition was made by adding about 2 grams to 400 milliliters of water. Viscosity tests on the L.V.F. Brookfield viscometer described above, with a number 2 spindle, demonstrated that a maximum viscosity of about 4973 centipoises at 6 r.p.m. was achieved in about 6 minutes at room temperature.

EXAMPLE 5

The composition of Example 4 was tested in the same manner as Example 4 except that continuous agitation was stopped after the first minute. Sequential readings indicated a maximum viscosity of about 4978 centipoises at 6 r.p.m. on a number 2 spindle was achieved in about 30 minutes at room temperature.

EXAMPLE 6

Two grams of SEPARAN AP273 polymer were poured with light stirring on the surface of 400 milliliters of water at room temperature. The powder, of average particle size of about 0.5 millimeter, floated and balled-up to form lumps which could not be easily dissolved even after extended time and agitation.

EXAMPLE 7

To about a 15% gel of polyacrylamide of about 9% hydrolysis, was added, in the same manner as in Example 2, a mixture of:

| Components Added | As a Percentage of the Weight of Polymeric Material |
| --- | --- |
| polyethylene glycol E1000 (average molecular weight 1000) | 5 |
| DOWFAX 2Al surfactant | 0.12 |
| VORANOL CP700 polyether polyol | 0.5 |
| TWEEN 61 polyoxyethylene sorbitan monostearate | 0.5 |
| | 0.5 |

The gel was then dried and ground through a 18 US mesh screen. The composition was readily dispersible when dumped into room temperature water, without lumping and with very litle agitation. Some flocs were formed but a homogeneous solution was achieved within about 10 minutes with light agitation. Viscosity tests, as above, with continuous stirring indicated achievement of maximum viscosity of about 413 centipoises at 60 r.p.m. on a number 2 spindle in about 5 minutes at room temperature.

EXAMPLE 8

The polyacrylamide gel of Example 7, with no added components, was dried and milled through a 20 US mesh screen. When dumped into unstirred water of room temperature, the dried polyacrylamide floated on the surface and on stirring balled-up to form slubs which did not dissolve even after extended time and agitation. When slowly added to a stirred beaker of water at room temperature, the dried polyacrylamide was almost completely dispersed and a maximum viscosity of about 580 centipoises at 60 r.p.m. on a number 4 spindle was observed at about 2 minutes at room temperature.

EXAMPLE 9

To about a 15% gel of SEPARAN MG200 polymer, in the manner of Example 2, was added a mixture of:

| Components Added | As a Percentage of the Weight of Polymeric Material |
| --- | --- |
| polyethylene glycol (1000 average molecular weight) | 3 |

| Components Added | As a Percentage of the Weight of Polymeric Material |
|---|---|
| DOWFAX 2Al surfactant | 0.12 |
| VORANOL CP700 polyether polyol | 0.5 |
| SPAN 60 surfactant | 0.5 |

The gel mixture was then dried and ground, as above, to pass about a 18 US mesh screen. The composition was poured into room temperature water and readily dispersed without lumping and with very little agitation. Viscosity tests as described above, with continuous stirring, indicated achievement of a maximum viscosity of about 160 centipoises at 60 r.p.m. on a number 2 spindle in about 5 minutes at room temperature.

EXAMPLE 10

To about a 15% gel of SEPARAN AP45 polymer was added, in the manner of Example 2, a mixture of:

| Components Added | As a Percentage of the Weight of Polymeric Material |
|---|---|
| polyethylene glycol E1000 (1000 average molecular weight) | 5 |
| DOWFAX 2Al surfactant | 0.5 |
| VORANOL CP700 polyether polyol | 0.5 |
| SPAN 60 surfactant | 0.5 |

After the gel was roll dried as before, the composition was milled and then separated into fractions of various particle size. Each fraction was then tested for viscosity at about 0.5% concentration in ion exchange water at room temperature. When poured into water at room temperature, each fraction readily dispersed with little agitation, with the exception of the fraction of about 0.12 to about 0.09 millimeter size, which lumped when stirred. Maximum viscosity and time of achievement are as follows, on a number 4 spindle at 60 r.p.m.:

| Particle Size (millimeter) | Maximum Viscosity (centipoises) | Time (minutes) |
|---|---|---|
| (a) about 0.8–0.5 | 1400 at about | 10 |
| (b) about 0.4–0.25 | 1580 at about | 3 |
| (c) about 0.18–0.15 | 1530 at about | 1 |
| (d) about 0.12–0.09 | 1570 at about | 1 |

EXAMPLE 11

A 1.3 gram mixture of the following:

| Components Added | As a Percentage of the Weight of Polymeric Material |
|---|---|
| polyethylene glycol E1000 (1000 average molecular weight) | 5 |
| DOWFAX 2Al surfactant | 0.12 |
| VORANOL CP700 polyether polyol | 0.5 |
| SPAN 60 surfactant | 0.5 | was melted with about 0.7 gram of hot water; this melt-mix was then added to about 20 grams of METHOCEL MC400 methylcellulose in a blender and mixed and dried as in Example 1. The composition showed good dispersibility when poured into ion exchange water at room temperature with formation of a few light flocs which dissolved with light agitation after about 20 minutes. One drop of tributyl phosphate was added to the solution to eliminate foaming.

EXAMPLE 12

A quantity of METHOCEL 65HG4000 hydroxypropyl methylcellulose was treated in the same manner with the same mixture as in Example 11. Good dispersibility in room temperature ion exchange water was observed with little agitation. The solution rapidly achieved maximum viscosity, as estimated by visual observation, in about 5 to 10 minutes. One drop of tributyl phosphate was again added to eliminate foaming on dispersion.

EXAMPLE 13

In the manner of Example 1, a sample of SEPARAN PG5 polymer was mixed with the following:

| Components Added | As a Percentage of the Weight of Polymeric Material |
|---|---|
| polyethylene glycol E1000 (1000 average molecular weight) | 3 |
| DOWFAX 2Al surfactant | 0.5 |

The composition showed good dispersibility when poured on room temperature ion exchange water and then was stirred lightly.

EXAMPLE 14

In the manner of Example 2, a sample of about a 15% gel of polyacrylamide, of about 9% hydrolysis, was mixed with about 5% of its weight of polyethylene glycol E1000 (1000 average molecular weight). The composition was dried and milled through a 20 US mesh screen. When poured into ion exchange water at room temperature, the composition dispersed fairly well after being agitated with some large flocs being formed. The composition was then tested for viscosity and achieved a maximum of about 388 centipoises in 7 minutes on a number 2 spindle at 60 r.p.m. Some large flocs remained after about 10 minutes of light agitation.

EXAMPLE 15

In the manner of Example 2, a sample of about a 15% gel of polyacrylamide, of about 9% hydrolysis, was mixed with about 5% of its weight of polyethylene glycol E1000 (1000 average molecular weight) and about 0.12% of its weight of DOWFAX 2Al surfactant. The composition was dried and milled through a 20 US mesh screen. When poured into ion exchange water at room temperature, the composition dispersed well with light agitation. Some small flocs were formed. The composition was tested for viscosity with a maximum of about 469 centipoises being reached in about 10 minutes on a number 2 spindle at 60 r.p.m. A few fine flocs remained after about 10 minutes of light agitation.

I claim:

1. A composition of matter comprising a finely divided, water-soluble cellulose ether, hereinafter polymeric material, of about 50,000 to about 10,000,000 average molecular weight, of a particle size predominantly larger than about 0.06 millimeter and less than about 1.7 millimeter, in intimate mixture with components A, B, C and D, the combined weight of said components being from a small effective amount to about 10% of the weight of the polymeric material, wherein:

Component A is a water-soluble polyol selected from the group consisting of lower aliphatic polyols of less than about 200 average molecular weight and lower polyalkylene glycols of from about 400 to about 9,000 average molecular weight, added in an amount of about 2% to about 8% of the weight of the polymeric material;

Component B is a surface-active agent of from about 15 to about 40 HLB, added in an amount of about 0.1% to about 2% of the weight of the polymeric material, and is selected from the group consisting of:
a. potassium and sodium salt of fatty acids,
b. potassium and sodium salts of aryl- and alkaryl-carboxylic acids,
c. potassium and sodium sulfonates of fatty acids and of fatty acid higher esters,
d. potassium and sodium salts of aryl- and alkaryl-sulfonates and -disulfonates,
e. potassium and sodium salts of higher alkanol and hydroxyalkaryl sulfates, and
f. potassium and sodium salts of carboxylic acid substituted quaternary amines;

Component C is a surface-active agent of about 15 to about 18 HLB, added in an amount of about 0.1% to about 2% of the weight of the polymeric material, and is selected from the group consisting of lower oxyalkylene ethers and polyesters of aliphatic polyols and polyol anhydrides and has an average molecular weight of about 200 to about 6,000;

Component D is a nonionic surface-active agent of less than about 10 HLB, added in an amount of about 0.1% to about 2% of the weight of the polymeric material;

provided that when the polymeric material is composed of more than about 90% of a material which hydrates with rapidity about equal to or less than that of polyacrylamide, then components C and D or either of them may be omitted and when so omitted said composition consists essentially of said water-soluble cellulose ether, Component A and Component B.

2. The composition of claim 1 wherein components A, B, C and D form a uniform coating on the polymeric material, the combined quantity of said components being from a small effective amount to about 10% of the weight of the polymeric material.

3. A composition of matter comprising a finely divided, water-soluble polyacrylamide which is less than about 40% hydrolyzed, of about 50,000 to about 10,000,000 average molecular weight, of a particle size predominantly larger than about 0.06 millimeter and less than about 1.7 millimeter, in intimate mixture with Components A, B, C and D, the combined weight of said components being from a small effective amount to about 4% of the weight of the polyacrylamide, wherein:

Component A is a water-soluble polyol selected from the group consisting of lower aliphatic polyols of less than about 200 average molecular weight and lower polyalkylene glycols of from about 400 to about 9,000 average molecular weight, added in an amount of about 2% to about 3% of the weight of the polyacrylamide;

Component B is a surface-active agent of from about 15 to about 40 HLB, added in an amount of about 0.1% to about 0.25% of the weight of polyacrylamide, and is selected from the group consisting of:
a. potassium and sodium salts of fatty acids,
b. potassium and sodium salts of aryl- and alkaryl-carboxylic acids,
c. potassium and sodium sulfonates of fatty acids and of fatty acid higher esters,
d. potassium and sodium salts of aryl- and alkaryl-sulfonates and -disulfonates,
e. potassium and sodium salts of higher alkanol and hydroxyalkaryl sulfates, and
f. potassium and sodium salts of carboxylic acid substituted quaternary amines;

Component C is a surface-active agent of about 15 to about 18 HLB, added in an amount of about 0.1% to about 0.5% of the weight of the polyacrylamide, and is selected from the group consisting of lower oxyalkylene ethers and polyesters of aliphatic polyols and polyol anhydrides and has an average molecular weight of about 200 to about 6,000;

Component D is a nonionic surface-active agent of less than about 10 HLB, added in an amount of about 0.1% to about 0.5% of the weight of the polyacrylamide;

provided that when the polyacrylamide is less than about 10% hydrolyzed, Components C and D or either of them may be omitted and when so omitted said composition consists essentially of said polyacrylamide, Component A and Component B.

4. A composition of matter comprising a finely divided, water-soluble organic polymer or copolymer, hereinafter polymeric material, of about 50,000 to about 10,000,000 average molecular weight, of a particle size predominantly larger than about 0.06 millimeter and less than about 1.7 millimeter, in intimate mixture with Components A, B, C and D, the combined weight of said components being from a small effective amount to about 10% of the weight of the polymeric material, wherein:

Component A is water-soluble polyoxyethylene glycol of about 1,000 average molecular weight, added in an amount of about 2% to about 8% of the weight of the polymeric material;

Component B is the disodium salt of disulfonated didodecyldiphenyl oxide, added in an amount of about 0.1% to about 2% of the weight of the polymeric material;

Component C is a surface-active agent of about 15 to about 18 HLB, added in an amount of about 0.1% to about 2% of the weight of the polymeric material, and is a propylene oxide adduct of glycerol and has an average molecular weight of about 700;

Component D is a sorbitan monostearate, added in an amount of about 0.1% to about 2% of the weight of the polymeric material;

provided that when the polymeric material is composed of more than about 90% of a monomeric material which hydrates with rapidity about equal to or less than that of polyacrylamide, then Components C and D or either of them may be omitted and when so omitted said composition consists essentially of said water-soluble organic polymer, Component A and Component B.

5. The composition of claim 3 wherein components A, B, C and D are uniformly blended with the monomeric precursors of the polyacrylamide, the blend is polymerized, the finished product recovered and, if desired, further divided by mechanical means, provided that components A, B, C and D are such that the process of chain-termination and chain-transfer by said components is avoided.

6. The composition of claim 1 wherein component A is a polyethylene-polypropylene glycol of from about 600 to about 2000 average molecular weight, wherein the oxyethylene:oxypropylene weight ratio is about 1:0 to about 1:3, respectively.

7. The composition of claim 1 wherein component B is selected from the group of anionic surface-active agents consisting of aryl- and alkaryl-potassium sulfonates and sodium sulfonates, which are solids at room temperature.

8. The composition of claim 1 wherein component C is a propylene oxide adduct of glycerol, of from about 200 to about 700 average molecular weight.

9. The composition of claim 1 wherein component D is selected from the group consisting of laurates, palmitates, stearates and oleates of sorbitan.

10. An aqueous solution of from a small effective amount to about 30% by weight of the composition of claim 1.

11. The composition of claim 3 wherein the polyacrylamide is from about 10% to about 35% hydrolyzed.

12. The composition of claim 3 wherein the polyacrylamide is less than about 10% hydrolyzed.

13. The composition of claim 4 wherein the polymeric material is polyacrylamide which is less than about 40% hydrolyzed.

14. The composition of claim 4 wherein the composition particle size ranges from about 0.1 millimeter to about 1.7 millimeter.

15. A process for the preparation of the composition of claim 3 wherein the polyacrylamide, in the form of an aqueous gel is intimately and uniformly blended with from a small effective amount to about 4% of the polyacrylamide's weight of a mixture of components A, B, C and D, as defined in claim 3, and the blended gel is thereafter dried and mechanically divided into particles of the desired size.

16. The process of rapidly dispersing and dissolving a finely divided, water-soluble organic polymer or copolymer in aqueous medium comprising contacting the composition of claim 1 with the aqueous medium.

17. A composition of matter comprising a finely divided, water-soluble organic polymer or copolymer, hereinafter polymeric material, of about 50,000 to about 10,000,000 average molecular weight, of a particle size predominantly larger than about 0.06 millimeter and less than about 1.7 millimeter, in intimate mixture with components A, B, C and D, the combined weight of said components being from a small effective amount to about 10% of the weight of the polymeric material, wherein:

Component A is a water-soluble polyol selected from the group consisting of lower aliphatic polyols of less than about 200 average molecular weight and lower polyalkylene glycols of from about 400 to about 9,000 average molecular weight, added in an amount of about 2% to about 8% of the weight of the polymeric material;

Component B is a surface-active agent of from about 15 to about 40 HLB, added in an amount of about 0.1% to about 2% of the weight of the polymeric material, and is selected from the group consisting of:
a. potassium and sodium salts of fatty acids,
b. potassium and sodium salts of aryl- and alkaryl-carboxylic acids,
c. potassium and sodium sulfonates of fatty acids and of fatty acid higher esters,
d. potassium and sodium salts of aryl- and alkaryl-sulfonates and -disulfonates,
e. potassium and sodium salts of higher alkanol and hydroxyalkaryl sulfates, and
f. potassium and sodium salts of carboxylic acid substituted quaternary amines;

Component C is a surface-active agent of about 15 to about 18 HLB, added in an amount of about 0.1% to about 2% of the weight of the polymeric material, and is selected from the group consisting of lower oxyalkylene ethers and polyesters of aliphatic polyols and polyol anhydrides and has an average molecular weight of about 200 to about 6,000.

Component D is a nonionic surface-active agent of less than about 10 HLB, added in an amount of about 0.1% to about 2% of the weight of the polymeric material;

provided that when the polymeric material is composed of more than about 90% of a monomeric material which hydrates with rapidity about equal to or less than that of polyacrylamide, then Components C and D or either of them may be omitted and when so omitted said composition consists essentially of said water-soluble organic polymer, Component A and Component B;

and wherein Components A, B, C and D are uniformly blended in an aqueous gel of the polymeric material, the gel being about 5% to about 35% polymer by weight, the blend is dried and thereafter mechanically divided.

18. The composition of claim 17 wherein Component A is a polyethylene-propylene glycol of about 600 to about 2,000 average molecular weight, wherein the oxyethylene:oxypropylene weight ratio is about 1:0 to about 1:3, respectively; Component B is selected from the group of anionic surface-active agents consisting of aryl- and alkaryl-potassium sulfonates and sodium sulfonates which are solids at room temperature; Component C is a propylene oxide adduct of glycerol of from about 200 to about 700 average molecular weight; and Component D is selected from the group consisting of laurates, palmitates, stearates and oleates of sorbitan.

19. The process of rapidly dispersing and dissolving a finely divided, water-soluble organic polymer or copolymer in aqueous medium comprising contacting the composition of claim 17 with the aqueous medium.

20. The process of rapidly dispersing and dissolving a finely divided, water-soluble polyacrylamide in aqueous medium comprising contacting the composition of claim 3 with the aqueous medium.

21. The composition of claim 3 wherein Component A is a polyethylene-propylene glycol of about 600 to about 2,000 average molecular weight, wherein the oxyethylene:oxypropylene weight ratio is about 1:0 to about 1:3, respectively, Component B is selected from the group of anionic surface-active agents consisting of aryl- and alkaryl-potassium sulfonates and sodium sulfonates which are solids at room temperature; Component C is a propylene oxide adduct of glycerol of from about 200 to about 700 average molecular weight; and Component D is selected from the group consisting of laurates, palmitates, stearates and oleates of sorbitan.

* * * * *